United States Patent [19]

Peterson

[11] Patent Number: 5,607,588
[45] Date of Patent: Mar. 4, 1997

[54] SCRAPER FOR SCRAPING FILTER CAKE FROM MOVING FILTER MEDIUM

[76] Inventor: John G. Peterson, #4 Chelsea La., Vicksburg, Miss. 39180

[21] Appl. No.: 396,118

[22] Filed: Feb. 28, 1995

[51] Int. Cl.⁶ .................................................. B01D 33/46
[52] U.S. Cl. .................... 210/396; 210/400; 210/403; 210/404
[58] Field of Search .................................... 210/396, 391, 210/394, 392, 393, 400, 403, 404, 408

[56] References Cited

U.S. PATENT DOCUMENTS

| | | | |
|---|---|---|---|
| 1,914,742 | 6/1933 | Hillier | 210/393 |
| 2,887,787 | 5/1959 | Barkley | 210/396 |
| 3,643,806 | 2/1972 | O'Cheskey | 210/327 |
| 3,945,924 | 3/1976 | Peterson | 210/384 |
| 4,131,548 | 12/1978 | Peterson | 210/331 |
| 4,147,634 | 4/1979 | Wegener | 210/396 |
| 4,303,524 | 12/1981 | Richards et al. | 210/408 |
| 4,305,821 | 12/1981 | Crandall | 210/396 |
| 4,673,496 | 6/1987 | Turner | 210/232 |
| 5,240,609 | 8/1993 | Langley | 210/396 |
| 5,330,645 | 7/1994 | Geldmacher | 210/396 |

Primary Examiner—Cynthia L. Nessler
Attorney, Agent, or Firm—Terry M. Crellin

[57] ABSTRACT

An elongate scraper apparatus for scraping filter cake from a moving filter medium of a filter apparatus comprises an elongate bar or scraper having a length sufficient to substantially span the face of the filter medium upon which filter cake is deposited. The bar has a broad, continuous, smooth, front face that is parallel with the surface of the filter medium. The broad, front face of the bar or scraper allows substantial contact with the surface of the filter medium over the entire surface of the front face of the bar or scraper. The elongate bar or scraper further has a top face that forms a chisel edge at the top edge of the front face. The chisel edge points in a direction parallel with the surface of the filter medium. As the filter medium bulges outwardly, it applies uniform pressure on the broad face of the bar or scraper so that the bar or scraper flexes to conform to the contour of the bulging filter medium. The chisel edge of the bar or scraper remains in parallel orientation with the surface of the filter medium so that the chisel edge does not make pointed, contact with the filter medium.

16 Claims, 4 Drawing Sheets

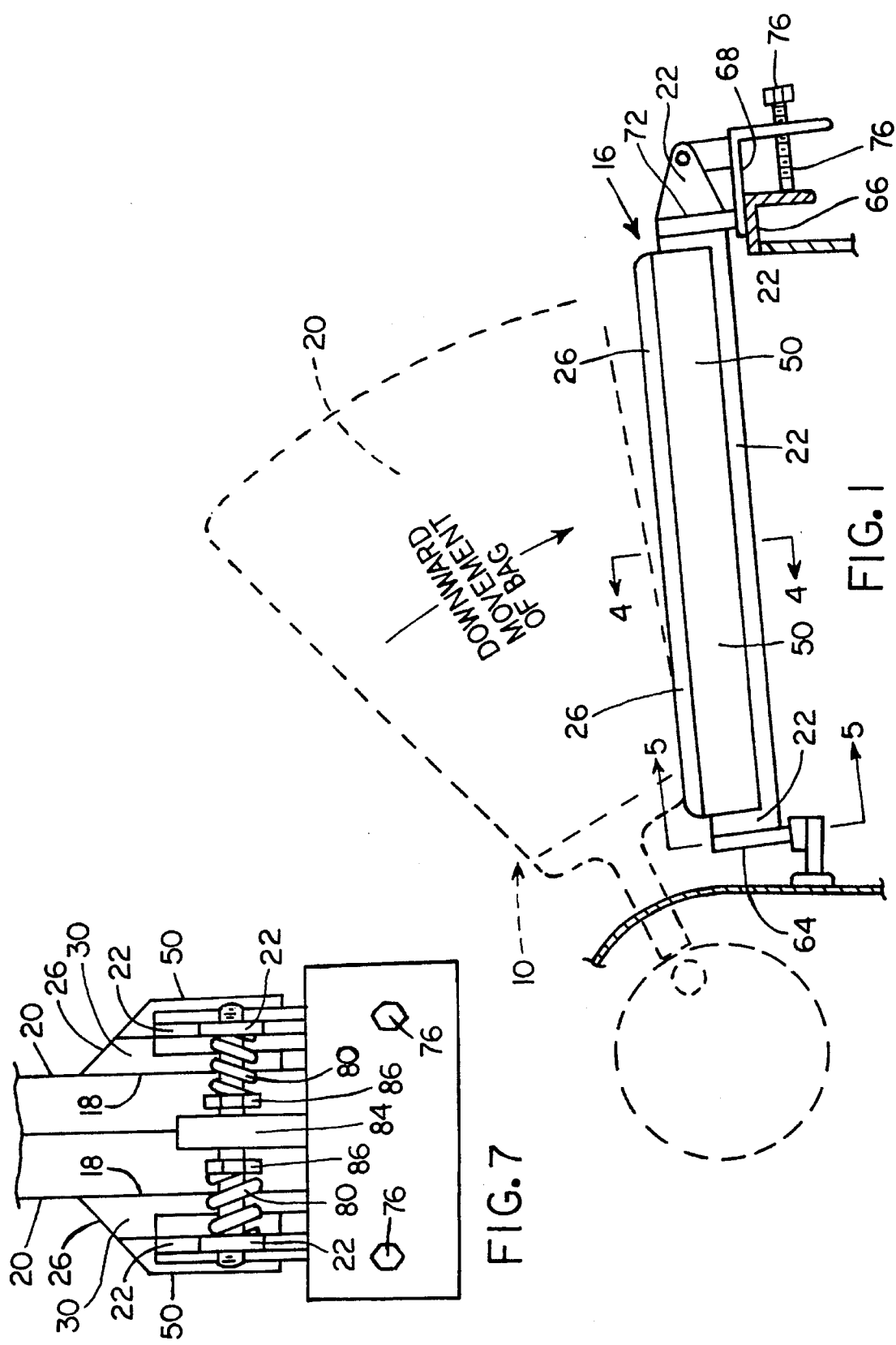

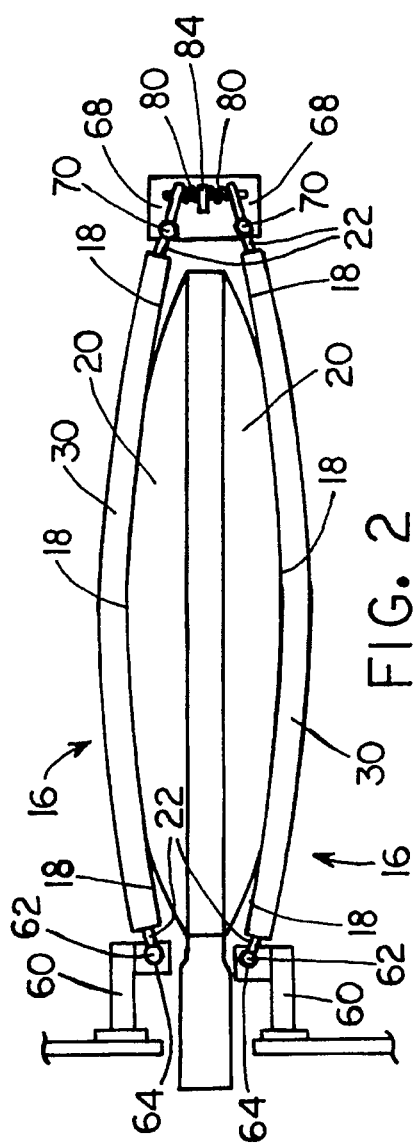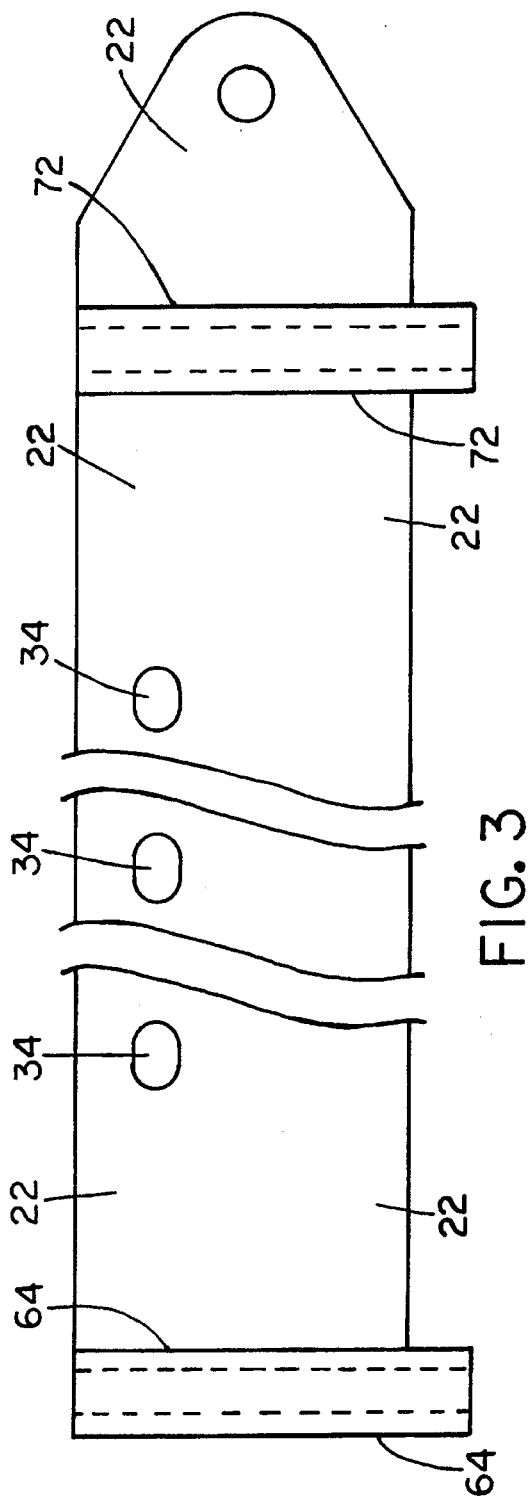

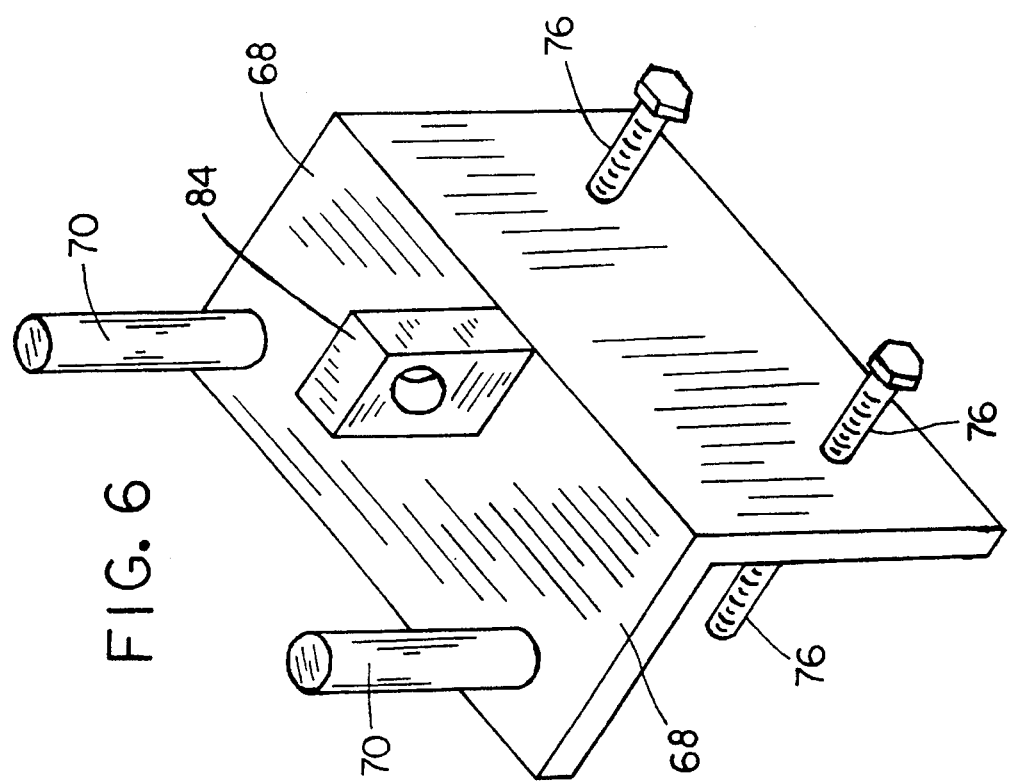
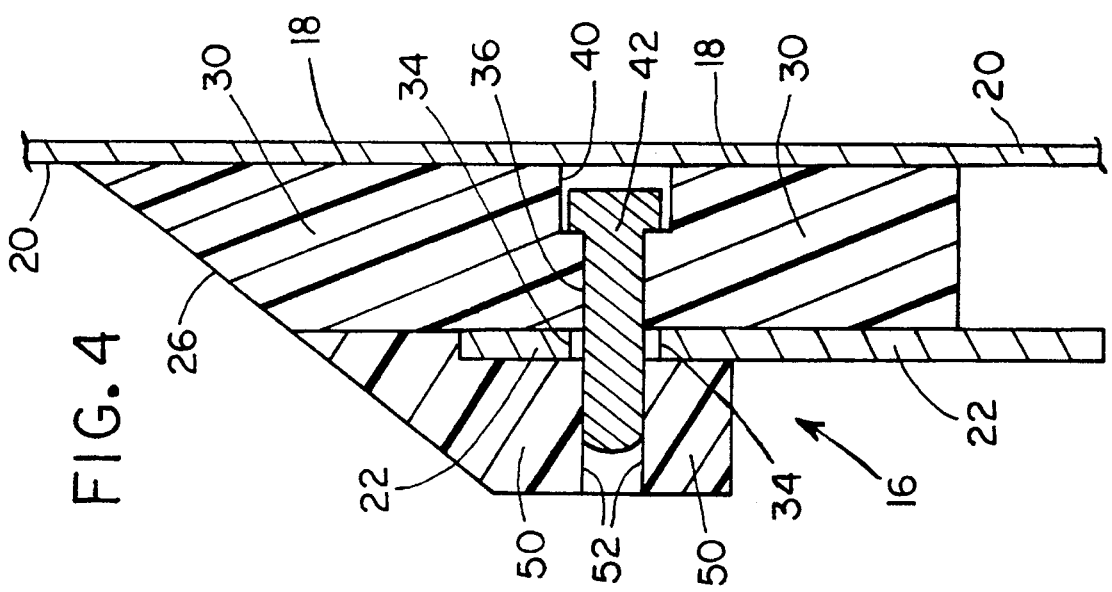

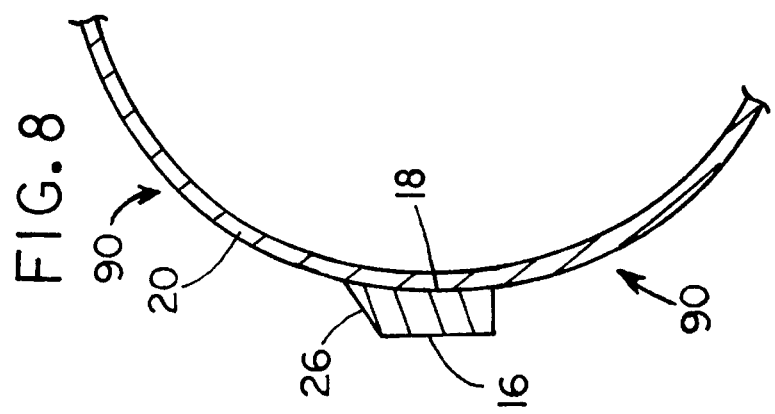
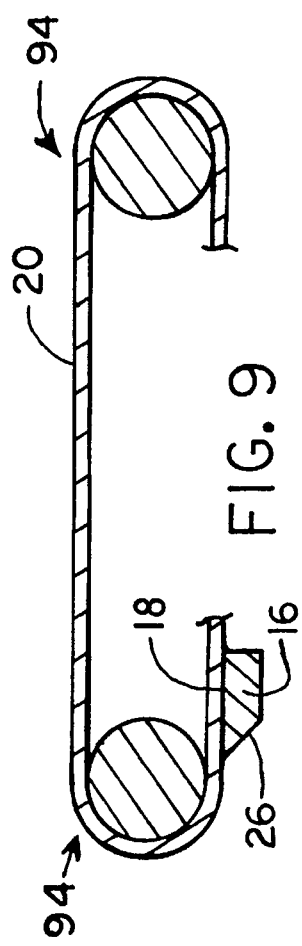
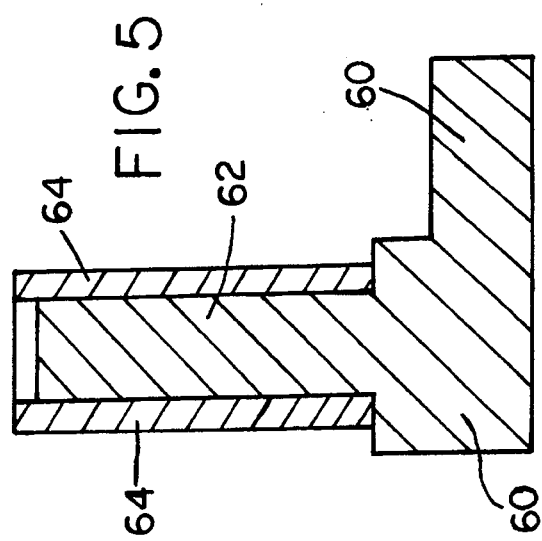

SCRAPER FOR SCRAPING FILTER CAKE FROM MOVING FILTER MEDIUM

BACKGROUND OF THE INVENTION

1. Field of the Invention

The present invention relates generally to scraper apparatus used in scraping filter cake from a moving filter medium. The invention, more specifically, relates to scraper apparatus or devices used with disc filters, drum filters and belt filters to dislodge filter cake from the filter medium as the filter medium moves past the scraper means.

2. State of the Art

There are various types of filters that utilize a moving filter medium. Disc filters utilize a rotating disc that revolves so that during a portion of its movement it is submerged in a liquor or slurry that is to be filtered. A drum filter is similar to a disc filter in that it revolves so that a portion of the drum is submerged in a liquor or slurry to be filtered. Common to both disc and drum filters, filter cake is removed from the filter medium during the portion of its movement when it is not submerged in the liquor or slurry being filtered.

Another common filter apparatus using a moving filter medium is a belt filter. Generally, the belt filter moves over a suction box and slurry is deposited on the filter, with mother liquor being pulled from the filtrate through the belt filter into the suction box. The belt filter must have filter cake removed from the filter medium during the portion of its travel from the tail end of the suction box back to the head end of the suction box. A scraper is commonly used on disc, drum and belt filters to aid in the dislodging and removal of filter cake from the filter medium as the filter medium moves past the scraper.

Continuous rotary filters operate by having a filter medium formed in the shape of a disc, with the disc rotating through a pool of filterable slurry. The inner side of the portion of the filter medium submerged in the pool is subjected to a reduced pressure for drawing liquid through the filter medium and depositing solids on the outside of the filter medium as a filter cake. Normally, such filters operate with about half of the filter medium submerged in the slurry and the remainder in the atmosphere. During travel of the filter cake through the atmosphere, the filter cake is subjected to washing and drying actions and is then subjected to a cake removal action. Cake removal is normally achieved by blowing air through the filter medium from the inner side as to blow the cake from the outside of the filter medium. To aid removal of the cake from the filter medium, a scraper is positioned to scrape the cake from the filter medium while it is under the influence of the blow-back air pressure.

Disc filters are constructed as a series of relatively thin, truncated wedges mounted in a annular arrangement to form a disc. Generally, each sector is covered by a bag made of filter medium, and such bags are tied at their lower ends to the sector bells and held at their outer ends. Since the filter medium or filter cloth bag is normally only secured at its outer and inner ends, blow-back pressure subjected internally of the bag bulges outwardly its sides. The greatest displacement of the bag on such bulging, of course, is along the middle portion of the sector. When such a bulging filter medium comes in contact with the scraper, the filter medium drags across the scraper causing wear.

A number of attempts have been made to overcome the effects of this filter medium bulging. In one such method, wires have been wrapped around the sector to hold the filter medium bag tightly on the filter sector. Since there are a substantial number of sectors in each disc and a substantial number of discs in each filter, the expense of wrapping wire around each sector greatly exceeds the savings achieved by extended bag life. In another attempt, a rubber scraper blade was stretched across the radial span of the bag. However, unless such a rubber blade is supported along its length, it curls downwardly under the influence of the bulging bag and is thus inoperative. If, on the other hand, such a rubber blade is supported by sufficient lengthwise reinforcing to stop the curling, it is too stiff and it cannot contour along the bulge line of the filter bag.

Most commercial disc filters utilize scrapers which are straight, fixed blades mounted with a spring mounting arrangement to permit some movement of the blade against the inflated bag. Because the blade is rigid, only the center portion of the bag is scraped, and the end portions which contour away from the bulged-out middle portion do not contact the scraper blade and are thus not cleared. Such an arrangement under optimum working conditions cleans less than about 75% of the bag. If the blade tension against the bag is increased, the bag overhangs the blade greatly increasing the drag on the bag, and greatly increasing wear.

The problem of dislodging and removing filter cake is also present when using a drum filter or belt filter. Drum filters and belt filters can be subject to the filter medium bulging as described previously with respect to disc filters. Filters of all types have presented a problem in effectively dislodging and removing filter cake from the filter medium without undue wear of the filter medium. In the past, it has been the universal practice to scrape the filter medium with a chisel edged device in which the chisel edge makes sharp, abrupt contact with the filter medium. It was thought that it was necessary to make a sharp contact to efficiently dislodge the filter cake from the filter medium. Thus, all scrapers have been made of blades that slant with respect to the surface of the filter medium so that only an edge of the scraper contacts the filter medium.

BRIEF DESCRIPTION AND OBJECTS OF THE INVENTION

According to the present invention I have quite unexpectedly discovered that the scraper may effectively be made from an elongate scraper blade or bar that has a substantially broad, continuous, smooth, front face. The words blade and bar are meant to be interchangeable with each other, and in the remainder of this disclosure the word bar will be used, with the proviso that the word blade could just as well be used. Means are provided for supporting the opposite ends of the bar from the filter apparatus so that the bar extends across the face of the filter medium with the front face of the bar allowing broad, substantially uniform contact with the filter medium over the entire surface of the front face of the bar. Preferably, the top face of the bar slants downwardly from the top side edge of the front face of the bar. This forms a chisel edge along the top side of the front face of the bar, but the chisel edge does not attack the face of the filter medium or point inwardly toward the face of the filter medium. Instead, the chisel edge is oriented to point in a direction parallel with and abutting the filter medium. The front face of the bar supports the filter medium so that the chisel edge does not strongly attack or point toward the filter medium even if internal pressure within the filter causes bulging of the filter medium.

Included among the objects and advantages of the present invention is to provide a scraper bar for a filter having a moving filter medium, wherein the scraper bar has a substantially broad, continuous, smooth face that allows broad, substantially uniform contact with the filter medium.

Another object of the invention is to provide such a filter scraper bar in which the top face of the bar slants downwardly from the top side edge of the scraper bar to form a chisel edge that extends along the filter medium, and wherein the front face of the scraper bar supports the filter medium so that the chisel edge does not attack or point towards the filter medium.

An additional object of the invention is to provide such a scraper bar having a thickness sufficient so the bar is substantially rigid in a direction parallel to the front face of the scraper bar, but which will allow the scraper bar to flex in a direction substantially perpendicular to a plane through a top side edge and a bottom side edge of the front face of the scraper bar so that the blade can effectively conform to bulging of the filter medium.

Another object of the invention is to provide a novel mounting system for the flexible scraper bar so that the bar can pivot at its opposite ends and at least one of the ends of the bar can move back and forth in a longitudinal direction of the bar.

A still further object of the invention is to provide means for adjusting the amount of movement allowed by the ends of the flexible scraper bar for controlling the amount of flex of the blade.

Another object of the invention is to provide means for applying a preset, adjustable, biasing force to the flexible scraper bar that induces the scraper bar to flex inwardly toward the filter medium such that the filter medium must press against the scraper bar with a sufficient force to overcome the biasing force before the scraper blade flexes outwardly with the filter medium.

Additional objects and features of the invention will become apparent from the following detailed description, taken together with the accompanying drawings.

THE DRAWINGS

Preferred embodiments of the present invention representing the best modes presently contemplated of carrying out the invention are illustrated in the accompanying drawings in which:

FIG. 1 is a side elevation, schematic view of a scraper bar according to the present invention illustrating its positioning in relation to a filter disc of a rotating disc filter;

FIG. 2 is a top plan, schematic view, illustrating the relationship of normal filter bag bulging of a rotating disc filter and the contour shape assumed by the flexible scraper bar of the present invention;

FIG. 3 is a side elevation of the metal support bar component of a preferred embodiment of a scraper bar of the present invention;

FIG. 4 is a cross-section through one of the scraper bars and associated filter medium taken along line 4—4 of FIG. 1;

FIG. 5 is a cross-section taken along line 5—5 of FIG. 1 of a rear end mount for holding the proximal end of the scraper bar at the hub of the filter disc;

FIG. 6 is a pictorial view of a front end mount for holding a distal end of the scraper bar at the perimeter of the filter disc;

FIG. 7 is an end view of the front end mount as positioned on a disc filter apparatus and showing a spring-loaded mechanism for biasing the scraper bar according to the present invention;

FIG. 8 is a schematic, cross-sectional view of a scraper bar of the present invention as used on a drum filter apparatus; and FIG. 9 is a schematic, cross-sectional view of a scraper bar of the present invention as used on a belt filter apparatus.

DETAILED DESCRIPTION OF THE ILLUSTRATED EMBODIMENTS

Referring to the drawings, several embodiments of scraper apparatus or devices are illustrated. Like parts in each of the Figures of the drawings will be identified with the same reference numerals. The scraper apparatus of the present invention are all adapted to dislodge and remove filter cake from the moving surface of a filter medium 20. The moving filter medium 20 can be one associated with a conventional rotating disc filter, a revolving drum filter or a moving belt filter.

The application of the scraper apparatus of the present invention to a conventional disc filter is illustrated in FIGS. 1–7 of the drawings. A disc filter commonly has a plurality of similar wedge shaped filter sectors 10, one of which is shown in FIG. 1. The sectors form a continuous disc, and the disc rotates about its central axis or hub. The disc rotates in approximately one-half of its travel beneath the surface of a pool of liquid, usually a slurry.

Each individual sector is covered by a filter medium 20, generally a bag shaped to the sector configuration. Means as are commonly known in the art are used to draw a reduced pressure within the sector 10 as the sector is moving beneath the surface of the liquid. Liquid is drawn through the filter medium 20 as the sector 10 moves through the pool, and a filter cake is built up on the external surfaces of filter medium 20 covering the sector 10.

The filter medium 20 is made of any usable type cloth or screen, including fiber cloth made from natural and synthetic fibers, woven wire cloths and screens. As each sector 10 emerges from the pool and rotates above the pool, an elevated pressure is applied within the sector 10 that aids in separating the filter cake from the surface of the filter medium 20. A scraper mechanism is commonly used to scrape the filter cake from the filter medium 20 as the sector 10 moves past the scraper mechanism. Inasmuch as there are generally two opposite, generally flat sides of each sector 10, one on each side of the disc, there are two scraper mechanisms arranged on the opposite sides of the disc so that each side of the filter medium 20 of each sector 10 gets scraped each revolution of the filter disc.

The novel scraper mechanism of the present invention comprises an elongate scraper bar 16 having a length sufficient to substantially span the face of the filter medium 20 upon which filter cake is deposited. The scraper bar 16 thus extends from a position adjacent to the hub of the filter disc to the perimeter of the filter disc. The scraper bar 16 further has a broad, continuous, smooth, front face 18.

Means are provided for supporting the opposite ends of the scraper bar 16 from the filter apparatus so that the scraper bar 16 extends across the face of the filter medium 20 with the front face 18 of the scraper bar 16 allowing broad, substantially uniform contact of the front face 18 with the filter medium 20 over the entire surface of the front face 18 of the scraper bar 16.

The scraper bar 16 is preferably formed from an elongate, essentially flat metal support bar 22 having a length sufficient to at least substantially span the face of the filter medium 20 of the filter apparatus. The metal support bar 22 has a width and thickness sufficient so that the support bar 22 is substantially rigid in a direction parallel to the front face 18. In a preferred embodiment, the metal support bar has a width of at least about two inches and a thickness of between about 1/16 inch and 1/2 inch. In a particularly preferred embodiment in which the scraper bar 16 can flex, the metal support bar 22 has a thickness of between about 1/8 inch and 1/4 inch such that the metal support bar 22 can flex in a direction substantially perpendicular to the width of the metal support bar 22 but is rigid and inflexible in a direction through the width of the metal support bar 22.

In all embodiments of the scraper mechanism in accordance with the present invention, the scraper bar 16 has a substantially planar top face 26 that slants downwardly so as to make an angle of between about 10 degrees and 75 degrees with a plane through a top side edge and bottom side edge of the front face 18 of the scraper bar 16. A chisel edge is formed along the intersection of the top face 26 and the top side edge of the front face 18. The chisel edge acts to dislodge filter cake from the filter medium 20, and the slanting top face 26 aids in moving the dislodged filter cake away from the filter medium 20.

In the embodiment of the invention in which the scraper bar 16 can flex, and is thus ideally suited to be used on a rotating disc filter in which the filter medium 20 tends to bulge outwardly as discussed previously, the support bar 22 is provided with an elongate scraper element 30 made of a wear resistant polymer, and the top face of the scraper element 30 slants so as to form the slanting planar top face 26 of the scraper bar 30. The scraper element 30 has first and second side faces that are spaced apart by a thickness of between about 1/4 inch and 3 inches. The scraper element 30 further has (1) a length sufficient to extend at least substantially across the face of the filter medium 20 upon which filter cake is deposited, (2) a width along a first face of between about 3 inches and 10 inches and (3) a width along a second face that is shorter than the width of the first face so that a top face of the scraper element 30 that extends between a top side edge of the first face and a top side edge of the second face slants so as to make an angle of between about 10 degrees and 75 degrees with a plane through the top side edge and bottom side edge of the first face. The slanting top face of the scraper element 30 forms the slanting planar top face of the scraper bar 30, with a chisel edge being formed along the top side edge of the first face of the scraper element 30.

Means are provided for mounting the scraper element 30 to the metal support bar 22 so that the scraper element 30 is positioned between the metal support bar 22 and the filter medium 20 to allow broad, substantially uniform contact of the first face of the scraper element 30 with the filter medium 20 over the entire surface of the first face of the scraper element 30. The chisel edge of the top side edge of the first face is pointed in a direction parallel to the surface of the filter medium 20 and acts to dislodge filter cake from the filter medium 20 as the filter medium 20 moves relative to the scraper element 30.

The scraper element 30 is flexible in a direction substantially perpendicular to the plane through the top side edge and bottom side edge of the first face of the scraper element 30. The means for mounting the scraper element 30 to the metal support bar 22 allows the scraper element 30 and the metal support bar 22 to flex outwardly in a smooth, continuous curve conforming to the bulging contour of the filter medium inasmuch as the filter medium 20 itself presses substantially uniformly against the broad first face of the scraper element 30 to flex the scraper element 30 outwardly. As shown in FIG. 2, the scraper bar 16, of which scraper element 30 is a part, flexes outwardly and conforms to the bulging contour of the filter medium 20.

The uniform contact between the filter medium 20 and the broad first face of the scraper element 30 provides the force necessary to flex the scraper mechanism, including the scraper element 30 and support bar 22, outwardly with only minimal wear and tear being exerted on the filter medium 20. The chisel edge of the scraper element 30 does not make pointed contact with the filter medium 20 and thereby does not attack the surface of the filter medium 20. This avoids the pointed contact of the chisel point with the filter medium as has universally occurred on filter apparatus of the prior art. The wear and tear resulting from the pointed contact of the scraper with the filter medium of prior art filter apparatus is essentially eliminated by the scraper mechanism of the present invention.

As illustrated, the means for mounting the scraper element 30 to the metal support bar 22 preferably comprises a plurality of openings 34 (FIGS. 3 and 4) spaced apart along the length of the metal support bar 22. The openings 34 in the metal support bar 22 extend through the thickness of the metal support bar 22. A plurality of complementary openings 36 (FIG. 4) are spaced apart along the length of the scraper element 30. The openings 36 in the scraper element 30 extend from the first face to the second face thereof and are spaced such that the openings 34 in the metal support bar 22 will register with respective openings 36 in the scraper element 30.

A plurality of counterbores 40 (FIG. 4) are provided in the first face of the scraper element 30. Each counterbore 40 surrounds a respective opening 36 in the scraper element 30 and extends inwardly from the first face of the scraper element 30. A plurality of bolts 42 (FIG. 4) are provided, with each of the bolts 42 extending from a respective counterbore 40 in the scraper element 30 through a respective pair of openings 34 and 36 in the scraper element 30 and the metal support bar 22.

Means are provided for retaining distal ends of the bolts at a back face of the metal support bar 22 that faces away from the flexible scraper element 30 so that the scraper element 30 and the metal support bar 22 can flex with each other. The openings 34 in the metal support bar 22 are oversized in their dimension along the length of the metal support bar 22 so that the openings 34 in essence form slots in which the bolts 42 can move back and forth to allow the metal support bar 22 to flex and bend with the scraper element 30 as the scraper element 30 is pressed outward by the filter medium 20.

In the illustrated embodiment, the means for retaining the distal ends of the bolts 42 at the back face of the metal support bar 22 comprises an elongate, flexible retainer element 50 made of a wear resistant polymer. The flexible retainer element 50 has first and second side faces spaced apart by a thickness of between about 5/8 inch and 1.5 inches. The flexible retainer element 50 further has a length sufficient to extend along the back face of the metal support bar 22 to a least substantially mate with the scraper element 30. The top face of said flexible retainer element preferably slants so as to be substantially in the same plane as the slanting top of the scraper element 30.

A plurality of bores 52 (FIG. 4) are spaced apart along the length of the flexible retainer element 50. The bores 52 in the flexible retainer element 50 extend inwardly from the first face of the flexible retainer element 50 and are spaced such that they will register with respective openings 34 and 36 in the metal support bar 22 and the scraper element 30.

Internal threads are provided in the bores 52 in the flexible retainer element 50 for threading of the bolts 42 into the bores 52 in the flexible retainer element 50. The openings 36 and the counterbores 40 in the scraper element 30 are both oversized in their dimension along the length of the scraper element 30 so that the openings 36 and counterbores 40 in the scraper element 30 in essence form slots in which the bolts 42 can move back and forth to allow the flexible retainer element 50 to flex and bend with the metal support bar 22 and the scraper element 30 as the scraper element 30 is pressed outwardly by the filter medium 20.

In the embodiments of the invention in which the scraper bar 16 is adapted to flex, the means for supporting the opposite ends of the metal support bar 22 from the filter apparatus must be adapted to allow the metal support bar 22 to pivot at its opposite ends. As shown in FIGS. 1, 2 and 5, the means for supporting the proximate end of the metal support bar 22 from the filter apparatus comprises a bracket 60 that is firmly attached to the frame of the filter apparatus adjacent to the hub or axis about which the filter disc rotates. A pivot axis pin 62 extends upwardly from the bracket 60, and the pin 62 is received in a cylindrical conduit 64 that is built into the proximal end of the metal support bar 22. The conduit 64 acts as a bearing that can pivot about the pin 62.

The means for supporting the distal end of the metal support bar 22 from the filter apparatus adjacent to the perimeter of the rotating filter disc comprises a lateral lip 66 on the frame of the filter apparatus. An angle member 68 is adapted to fit over the lip 66, with the first leg of the angle member 68 extending downwardly along the outer perimeter of the frame of the filter apparatus at the lip 66. The second leg of the angle member 68 extends inwardly from the lip 66 toward the hub or central axis of the filter apparatus. A pivot axis pin 70 extends upwardly from the second leg of the angle member 68. The pin 70 is received in a cylindrical conduit 72 (FIGS. 1 and 3) that is built into the distal end of the metal support bar 22. The conduit 72 acts as a bearing that can pivot about the pin 70.

The means for supporting the opposite ends of the metal support bar 22 from the filter apparatus must also be adapted to allow at least one of the ends of the metal support bar 22 to move back and forth in the longitudinal direction of the metal support bar 22 by a distance sufficient so that the metal support bar 22 can flex in a direction outwardly from the filter medium 22. This function is performed by the ability of the second leg of the angle member 68 to move to and fro along the lip 66 of the frame of the filter apparatus. As the metal support bar 22 straightens, the angle member 68 moves away from the filter apparatus so that the first leg of the angle member 68 is spaced from the outer perimeter of the frame of the filter apparatus. When the support bar 22 flexes and curves to adapt to the contour of a bulging filter medium 20, the angle member 68 moves toward the central hub or axis of the filter apparatus.

The means for supporting the opposite ends of the metal support bar 22 from the filter apparatus is advantageously further adapted to adjust the amount of movement allowed by the ends of the metal support bar 22 for controlling the amount of flex of the metal support bar 22. The angle member 68 is also utilized in achieving this latter means. A limitation can be imposed on the amount of movement that the angle member 68 can make as the metal support bar 22 flexes and the angle member 68 moves toward the central hub or axis of the filter apparatus. Adjustable bolts 76 (FIGS. 1, 6 and 7) are threaded through threaded openings in the first leg of the angle member 68. As the bolts 76 are advanced toward the frame of the filter apparatus, the movement of the angle member 68, and thus the distal ends of the metal support bar 22, is restrained. By restraining the amount of movement of the distal end of the support bar 22, the amount of flex of the support bar can also be restrained and controlled.

The means for supporting the opposite ends of the metal support bar 22 from the filter apparatus can also be used to apply a preset, adjustable biasing force to the metal support bar 22 that induces the metal support bar 22 to flex inwardly toward the filter medium 20, so that the filter medium must press against the front face of the scraper element 30 with a sufficient force to overcome the biasing force before the metal support bar 22 flexes outwardly with the filter medium 20.

The function of applying a biasing force to the metal support bar 22 is advantageously performed by providing an adjustable spring means at the distal ends of a pair of metal support bars 22 located adjacent to the perimeter of the filter disc. The distal ends of the support bars extend beyond the conduits 72 and pins 70 so that if a force is applied to the distal ends of the metal support bars 22 in a direction substantially perpendicular to and away from the central plane of the filter disc, the portions of the metal support bars 22 facing the filter disc will be biased to flex slightly toward the filter disc.

Adjustable compression springs 80 (FIGS. 2 and 7) are preferably used to apply the force to the distal ends of the metal support bars 22. Each compression spring 80 is positioned on a threaded rod that extends between a lug 84 on the angle member 68 and a respective end of a metal support bar 22 as shown in FIG. 7. Adjusting nuts 86 (FIG. 7) can be tightened on the compression springs 80 to increase the outward force applied by the springs 80 to the distal ends of the metal support bars 22.

The scraper mechanism of the present invention can be advantageously used on drum filters and belt filters in addition to rotary disc filters. As shown schematically in FIG. 8, the scraper bar 16 can be mounted longitudinally along the surface of a rotating drum filter 90. In such an application, the front face 18 of the scraper bar 16 has an indented, curved shape that has a radius corresponding to the radius of the drum filter 90 so that the front face 18 of the scraper bar 16 allows broad, substantially uniform contact with the filter medium of the drum filter 90 over the entire surface of the front face 18 of the scraper bar 16.

As shown schematically in FIG. 9, the scraper mechanism of the present invention can also advantageously be adapted for use on belt filters 94. The filter medium of a belt filter 94 has a substantially flat surface as does the filter medium of a rotary disc filter. In both these applications, the front face 18 of the scraper bar 16 is substantially planar so as to allow broad contact with the substantially flat filter medium over the entire surface of the front face 18 of the scraper bar 16.

Although preferred embodiments of the scraper mechanism of the present invention have been illustrated and described, it is to be understood that the present disclosure is made by way of example and that various other embodiments are possible without departing from the subject matter coming within the scope of the following claims, which subject matter is regarded as the invention.

I claim:

1. An elongate scraper for scraping filter cake from a moving filter medium of a filter apparatus, said scraper comprising an elongate bar having a length sufficient to substantially span the face of the filter medium upon which filter cake is deposited, said bar further having a broad, continuous, smooth, front face, said front face a width greater than the thickness of said bar, said bar being substantially rigid in a direction parallel to the front face of the bar and being substantially flexible in a direction substantially perpendicular to the plane through a top side edge and bottom side edge of said front face of the bar; and means for supporting the opposite ends of the bar from the filter apparatus so that the bar extends across the face of the filter medium with the front face of said bar allowing broad, substantially uniform contact with said filter medium over the entire surface of said front face of said bar, said means for supporting the opposite ends of the bar further defining means for (1) allowing the bar to pivot at each of its opposite ends about a pivot axis, the pivot axis being substantially perpendicular to a longitudinal direction of said bar, and (2) allowing at least one of the ends of said bar to move back and forth in the longitudinal direction of said bar by a distance of no more than about 3 inches, whereby said bar is flexible in a direction outwardly from said filter medium.

2. An elongate scraper in accordance with claim 1 wherein said bar has a substantially planar top face that slants downwardly so as to make an angle of between about 10 degrees and 75 degrees with a plane through a top side edge and bottom side edge of the front face, whereby a chisel edge is formed along the top side edge of said front face to dislodge filter cake from the filter medium and the slanting top face aids in moving the dislodged filter cake away from the filter medium.

3. An elongate scraper in accordance with claim 1 wherein the elongate scraper is mounted to a filter apparatus of the rotating disc type and the front face of said scraper is substantially planar so as to allow broad contact with the filter medium.

4. An elongate scraper in accordance with claim 1 wherein the elongate scraper is mounted to a filter apparatus of the rotating drum type and the front face of said elongate scraper has an indented curved shape having a radius that corresponds substantially to the radius of the drum filter so that the first face of said scraper element allows broad, substantially uniform contact with the filter medium over the entire surface of said first face.

5. An elongate scraper in accordance with claim 1 wherein the elongate scraper is mounted to a filter apparatus of the type having a moving belt filter medium and the front face of said scraper is substantially planar so as to allow broad contact with the belt filter medium.

6. An elongate scraper in accordance with claim 1 wherein said means for supporting the opposite ends of said bar further has means for adjusting the amount of movement allowed by the ends of said bar for controlling the amount of flex of the bar.

7. An elongate scraper in accordance with claim 6 wherein said means for supporting the opposite ends of said bar further comprises means for applying a preset, adjustable biasing force to said bar that induces the bar to flex inwardly toward said filter medium, wherein said filter medium must press against said front face of said bar with a sufficient force to overcome the biasing force before said bar flexes outwardly with said filter medium.

8. An elongate scraper assembly for scraping filter cake from a moving filter medium of a filter apparatus, said assembly comprising an elongate, essentially flat metal support bar having a length sufficient to at least substantially span the face of the filter medium of the filter apparatus, a width of at least about two inches and a thickness of between about $\frac{1}{16}$ inch and $\frac{1}{2}$ inch, said metal support bar being flexible in a direction substantially perpendicular to the width of the metal support bar and being rigid and inflexible in a direction through the width of the metal support bar;

means for supporting the opposite ends of the metal support bar from the filter apparatus so that the metal support bar extends across the face of the filter medium of the filter apparatus, with the wide face of said metal support bar facing the filter medium, said means for supporting the opposite ends of the metal support bar from the filter apparatus defining means for (1) allowing the metal support bar to pivot at each of its opposite ends about a pivot axis, the pivot axis being substantially perpendicular to a longitudinal direction of said bar and (2) allowing at least one of the ends of said metal support bar to move back and forth in the longitudinal direction of said metal support bar by a distance sufficient so that said metal support bar is flexible in a direction outwardly from said filter medium;

an elongate scraper element made of a wear resistant polymer, said scraper element having first and second faces spaced apart by a thickness of between about $\frac{1}{4}$ inch and 3 inches, said scraper element further having (1) a length sufficient to extend at least substantially across the face of the filer medium upon which filter cake is deposited, (2) a width along a first face of between about 3 inches and 10 inches and (3) a width along a second face that is shorter than the width of the first face so that a top of said scraper element that extends between a top side edge of said first face and a top side edge of said second face slants so as to make an angle of between about 10 degrees and 75 degrees with a plane through the top side edge and bottom side edge of said first face, whereby a chisel edge is formed along the top side edge of said first face, said scraper element being flexible in a direction substantially perpendicular to the plane through the top side edge and bottom side edge of said first face of said scraper element; and means for mounting said scraper element to said metal support bar so that the scraper element is positioned between the metal support bar and the filter medium to allow broad, substantially uniform contact of said first face of said scraper element with said filter medium over the entire surface of said first face of said scraper element, and with the chisel edge of said top side edge of said first face acting to dislodge filter cake from the filter medium as the filter medium moves relative to said first face of said scraper element, said means for mounting said scraper element to said metal support bar further defining means for allowing the scraper element to flex outwardly in a smooth, continuous curve with said metal support bar as said filter medium presses substantially uniformly against the broad first face of said scraper element.

9. An elongate scraper assembly in accordance with claim 8 wherein said means for supporting the opposite ends of said metal support bar further has means for adjusting the amount of movement allowed by the ends of said metal support bar for controlling the amount of flex of the metal support bar.

10. An elongate scraper in accordance with claim 8 wherein said means for supporting the opposite ends of said metal support bar further comprises means for applying a preset, adjustable biasing force to said metal support bar that induces the metal support bar to flex inwardly toward said filter medium, wherein said filter medium must press against said front face of said scraper element with a sufficient force to overcome the biasing force before said metal support bar flexes outwardly with said filter medium.

11. An elongate scraper assembly in accordance with claim 8 wherein the elongate scraper assembly is mounted to a filter apparatus of the rotating disc type and the first face of said scraper element is substantially planar to allow broad contact with the filter medium.

12. An elongate scraper assembly in accordance with claim 8 wherein the elongate scraper assembly is mounted to a filter apparatus of the rotating drum type and the first face of said scraper element has an indented curved shape having a radius that corresponds substantially to the radius of the drum filter so that the first face of said scraper element allows broad, substantially uniform contact with the filter medium over the entire surface of said first face.

13. An elongate scraper in accordance with claim 8 wherein the elongate scraper assembly is mounted to a filter apparatus of the type having a moving belt filter medium and the front face of said scraper is substantially planar so as to allow broad contact with the belt filter medium.

14. An elongate scraper assembly in accordance with claim 8 wherein said means for mounting said scraper element to said metal support bar comprises a plurality of openings spaced apart along the length of said metal support bar, with said openings in said metal support bar extending through the thickness of said metal support bar;

a plurality of openings spaced apart along the length of said scraper element, with said openings in said scraper element extending from the first face to the second face thereof and being spaced such that the openings in the metal support bar will register with respective openings in said scraper element;

a plurality of counterbores in said scraper element, each counterbore surrounding a respective opening in said scraper element and extending inwardly from the first face of said scraper element;

a plurality of bolts, with each of the bolts extending from a respective counterbore in said scraper element through a respective pair of openings in said scraper element and said metal support bar;

means for retaining distal ends of said bolts at a back face of said metal support bar that faces away from said flexible scraper element; and wherein said openings in said metal support bar are oversized in their dimension along the length of said metal support bar so that the openings form slots in which the bolts can move back and forth to allow the metal support bar to flex and bend with the scraper element as the scraper element is pressed outward by the filter medium.

15. An elongate scraper assembly in accordance with claim 14 wherein the means for retaining the distal ends of said bolts at the back face of said metal support bar comprises an elongate, flexible retainer element made of a wear resistant polymer, said flexible retainer element having first and second faces spaced apart by a thickness of between about ⅝ inch and 1.5 inches, and flexible retainer element further having a length sufficient to extend along the back face of said metal support bar to a least substantially mate with said scraper element;

a plurality of bores spaced apart along the length of said flexible retainer element, with said bores in said flexible retainer element extending inwardly from the first face of said flexible retainer element and being spaced such that the bores in the flexible retainer element will register with respective openings in said metal support bar and said scraper element;

internal threads in said bores in said flexible retainer element for threading of said bolts into said bores in said flexible retainer element; and further wherein said openings and said counterbores in said scraper element are both oversized in their dimension along the length of said scraper element so that the openings and counterbores in said scraper element form slots in which the bolts can move back and forth to allow the flexible retainer element to flex and bend with the metal support bar and the scraper element as the scraper element is pressed outwardly by the filter medium.

16. An elongate scraper assembly in accordance with claim 14 wherein a top of said flexible retainer element slants so as to be substantially in the same plane as the slanting top of said scraper element.

* * * * *